(12) United States Patent
Ashdown et al.

(10) Patent No.: US 6,308,276 B1
(45) Date of Patent: Oct. 23, 2001

(54) SS7 FIREWALL SYSTEM

(75) Inventors: Mike Ashdown, Frisco; Steve Lynchard, San Antonio, both of TX (US)

(73) Assignee: ICom Technologies, San Antonio, TX (US)

( * ) Notice: Subject to any disclaimer, the term of this patent is extended or adjusted under 35 U.S.C. 154(b) by 0 days.

(21) Appl. No.: 09/391,295

(22) Filed: Sep. 7, 1999

(51) Int. Cl.[7] .................................. H04L 9/00; H04L 9/32
(52) U.S. Cl. ............................................. 713/201; 713/200
(58) Field of Search .................................. 713/200, 201; 370/467; 379/34, 230

(56) References Cited

U.S. PATENT DOCUMENTS

| | | | |
|---|---|---|---|
| 5,416,842 | 5/1995 | Aziz | 380/30 |
| 5,592,530 | * 1/1997 | Brockman et al. | 379/34 |
| 5,606,668 | 2/1997 | Shwed | 395/200.11 |
| 5,623,601 | 4/1997 | Vu | 395/187.01 |
| 5,696,898 | 12/1997 | Backer et al. | 395/187.01 |
| 5,802,278 | 9/1998 | Isfeld et al. | 395/200.02 |
| 5,826,014 | 10/1998 | Coley et al. | 395/187.01 |
| 5,828,833 | 10/1998 | Belville et al. | 395/187.01 |
| 5,835,726 | 11/1998 | Shwed et al. | 395/200.59 |
| 5,845,070 | 12/1998 | Ikudome | 395/187.01 |
| 5,864,666 | 1/1999 | Shrader | 395/187.01 |
| 5,878,231 | 3/1999 | Baehr et al. | 395/200.75 |
| 5,889,958 | 3/1999 | Willens | 395/200.59 |
| 5,898,784 | 4/1999 | Kirby et al. | 380/49 |
| 5,898,830 | 4/1999 | Wesinger, Jr. et al. | 395/187.01 |
| 5,903,732 | 5/1999 | Reed et al. | 395/200.59 |
| 5,915,008 | 6/1999 | Dulman | 379/201 |
| 5,915,087 | 6/1999 | Hammond et al. | 395/187.01 |
| 6,011,803 | * 1/2000 | Bicknell et al. | 370/467 |
| 6,092,194 | * 7/2000 | Touboul | 713/200 |
| 6,122,363 | * 9/2000 | Friedlander et al. | 379/230 |

OTHER PUBLICATIONS http://www.tekelec.com, Tekelec–Raise Your Network to the Power of 7, printed on Jul. 20, 1999, 21 total pages.
http://www.inet.com, Welcome to Inet–A Worldwide Prov ... mmunications & Business Solutions, printed on Jul. 19, 1999, 10 total pages.

* cited by examiner

*Primary Examiner*—Ly V. Hua
(74) *Attorney, Agent, or Firm*—Jenkens & Gilchrist

(57) ABSTRACT

A system for controlling Signaling System #7 ("SS7") message traffic by defining a message control policy for SS7 signaling links and accepting, modifying, responding to, or rejecting SS7 signaling messages according to the defined control policy is disclosed. The control policy is composed of a set of access rules that are loaded onto one or more firewalls located at strategic points in a SS7 network. The firewalls use the access rules as the basis for examining each SS7 message a signaling node transmits or receives on a signaling link and determining whether or not to pass, modify, respond to, or reject the message. The system includes a graphical user interface for providing configuration information, as well as information as to the current and past states of the message traffic of a signaling node.

25 Claims, 5 Drawing Sheets

SS7 FIREWALL SYSTEM

BACKGROUND

The invention relates generally to SS7 networks and, more particularly, to a system and method for controlling and securing SS7 message traffic in an SS7 network.

The SS7 network is the backbone of the world's telecommunications networks. Service providers across the globe rely on the SS7 network to implement setup, routing, and control of a call, as well as to provide to residential, business, and government customers advanced services such as 800 and 900 calling, caller ID, local number portability, and calling card verification. Without the SS7 network, the world's telecommunications networks would cease to function properly.

The SS7 network is comprised of a number of different types of signaling nodes, including Service Switching Points ("SSPs"), Signaling Transfer Points ("STPs"), and Service Control Points ("SCPs"). SSPs originate, manage, and terminate calls. SCPs act as centralized databases that validate, authorize, and answer service requests from SSPs, such as how to route an 800 number call. STPs route SS7 messages between SSPs, SCPs, and other STPs. The SS7 network was designed to be a trusting network, and as such, the misuse of any signaling node could have alarming results like denial of customer service, redirected calls, violation of customer data, and fraud.

"Policy-based" security management refers to the enforcement of a governing set of rules at strategically located points ("chokepoints") for the purpose of enforcing security boundaries between two or more signaling nodes such that only those events meeting criteria defined by the policy may pass between the nodes while all other events are denied passage. Variations and improvements on this basic theme have resulted in devices known today as "firewalls." Much like a guard at a checkpoint, a firewall strictly enforces, on a message-by-message basis, access rules specified within an established control policy for what message traffic may pass. The policy may also dictate other actions to be performed with respect to message traffic, such as logging a security event in connection with a message or sequence of messages, sending an urgent alert message notifying appropriate personnel of a security event, or modifying a message.

As a result of telecommunication deregulation and industry growth, the SS7 network has expanded and is now vulnerable to attacks, intrusions, fraud, and misuse. Internet security professionals consider firewalls to be essential to protect an enterprise's local and wide area networks from external or internal misuse. A comprehensive SS7 firewall system would provide telecommunications service providers with a similar capability as well as much more, including the means to completely control every message entering and leaving the telecommunications service providers' SS7 signaling nodes. Without this capability, telecommunications service providers are exposed and vulnerable.

Current methods for controlling the ingress and egress of SS7 traffic to and from a telecommunications service providers' SS7 signaling nodes require the configuration of access control lists according to a fixed table format on a signaling element. As such, these methods are unable to reflect a service provider's complete control policy and are limited by the range of controls defined by the signaling system. Furthermore, these methods do not provide the service provider with a centrally managed system. In addition, current methods of controlling traffic on a signaling element control basis are only an extremely limited subset of the SS7 protocol.

Therefore, what is needed is a comprehensive SS7 message control system for a telecommunications service provider in which firewall elements are transparent to the underlying signaling nodes being protected, security reports are retrievable from a central location, and that is scaleable so as to accommodate emerging threats.

SUMMARY OF THE INVENTION

The present invention, accordingly, provides a system and method for performing security access control functions for a telecommunication service provider's signaling nodes, including, but not limited to, SSPs, SCPs, and STPs. In a preferred embodiment, an SS7 firewall is provided between an STP of the global SS7 network, and each of a service provider's signaling nodes, such as an SSP or SCP. In accordance with features of the present invention, the SS7 firewall controls all of the SS7 message traffic entering and leaving the service provider's signaling nodes.

In one aspect, the system of the present invention monitors every SS7 message entering and leaving a SS7 signaling node by providing with respect to the signaling node an SS7 message filter that inspects each message and compares it to a SS7 rule-set, or policy, to determine whether the node should accept, modify, respond to, or reject the message.

In another aspect, the system of the present invention maintains the state of each call, service, or transaction comprising a sequence of SS7 messages initiated or maintained by the signaling node in order to compare the state of the call, service, or transaction with an SS7 rule-set that is used to determine whether the node should continue, modify, respond to, or terminate the call, service, or transaction.

In another aspect, the system of the present invention provides, from a centralized location, an environment in which the SS7 message control policy for one or more signaling nodes is conveniently administered and configured by a system administrator without the need for significant software modification and in which a system administrator can obtain up-to-date reports of the control state of one or more of signaling nodes, as well as summary reports on the nature of the SS7 messages entering and leaving one or more signaling nodes.

These and other objectives and features of the invention encompass a comprehensive system for controlling and securing the SS7 signaling nodes of a telecommunications service provider. In the most basic configuration, passage of inbound and outbound SS7 message traffic is permitted or denied according to a rule-set that is managed by a security administrator. The system combines call progress monitoring, including message correlation and state management, transaction progress monitoring, including message correlation and state management, network management monitoring, and message verification.

The system and method of the invention performs centrally-managed, service provider-wide enforcement of an SS7 message control policy and real-time notification of potential policy breaches. The system utilizes specialized, high availability, "on-the-wire" devices to monitor, control, and insert messages into the SS7 packet-switched global SS7 network. The system controls access to the switches, databases, and advanced intelligent network (AIN) computer systems of a service provider, all of which function as SS7 signaling nodes. The system also "fails closed", ensuring SS7 message traffic is uninhibited in the event of a system failure.

Specific attributes identified by the controlling system pertaining to all inbound and outbound signal messages determine whether a call, transaction, or control message, in accordance with the a predefined control policy, are allowed, are denied, are negatively replied to, are logged, and/or initiate an alerting action. Attributes captured by the system are protocol-dependent and include mandatory fixed, mandatory variable, or optional parameters for components of the SS7 protocol, including, but not limited to, ISDN user part ("ISUP"), transaction capability application part ("TCAP"), signaling connection control part ("SCCP"), and operations, maintenance, and administration part ("OMAP"). In addition, the system maintains state between messages associated with call setup/tear-down and transaction queries, enabling the enforcement of a message control policy based on signaling state. State attributes captured by the system include, for example, call message verification, call type association, query request/response validation, global title translation call processing, and local number portability query lookup/call association.

In one embodiment, a system and method of controlling SS7 traffic is provided to control call set-up into and out of the SS7 signaling nodes of a telecommunications service provider. A control policy comprising a set of access rules specifying actions to be taken based upon at least one attribute of the call in progress is defined for call setup. In this embodiment, calls are tracked via SS7, extracting specific attributes that are available within the call setup, i.e., initial address message. Actions are then performed based upon the attributes of the call in accordance with the policy that applies to the corresponding signaling node.

The rule-set for control of signal traffic by the system governs how signaling nodes may be used and accessed within a service provider's network. Each rule, upon meeting certain criteria, initiates appropriate action(s).

A technical advantage achieved with the invention is signaling end points are protected by prefiltering of SS7 message traffic, such as by removing ISUP messages addressed for an SCP, as SCPs do not process ISUP messages.

Another technical advantage achieved with the invention is that it ensures quality of service ("Q,S.") for a switch by, for example, blocking a "flood" of ISUP messages destined for a switch that would otherwise saturate the switches capabilities and result in dropped calls for local customers.

DETAILED DESCRIPTION

Figure 1:
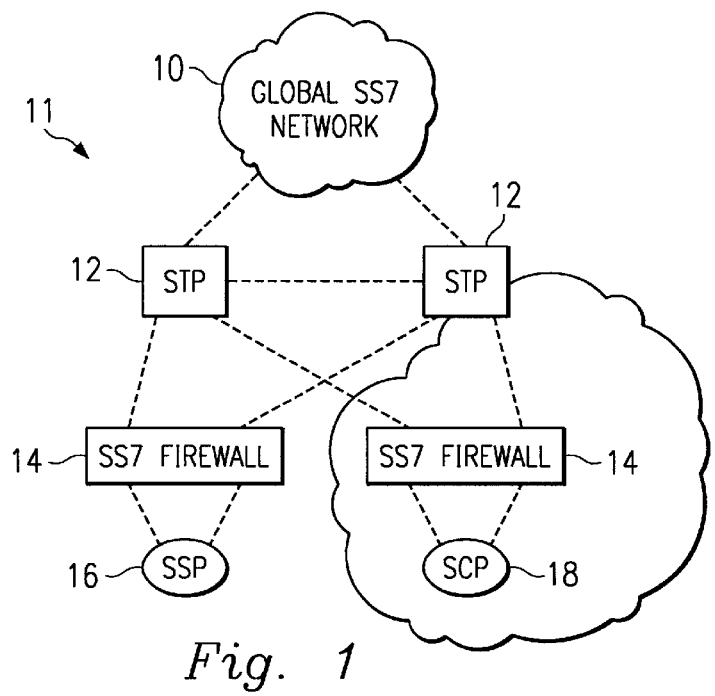
FIG. 1 is a schematic block diagram of an SS7 security system of the present invention.

In FIG. 1, a reference numeral 10 designates a global SS7 network comprising a vast worldwide network of SS7 signaling nodes and to which a service provider 11 is connected. As will be described in greater detail below, in accordance with features of the present invention, respective SS7 firewalls 14 are provided for monitoring and controlling all of the SS7 message traffic entering and leaving signaling nodes of a service provider 11, represented in FIG. 1 by an SSP 16 and an SCP 18. In this SS7 network configuration, the SSP 16/firewall 14 combination and SCP 17/firewall 14 combination are connected to the global SS7 network 10 via a mated pair of STPs 12.

Figure 2:
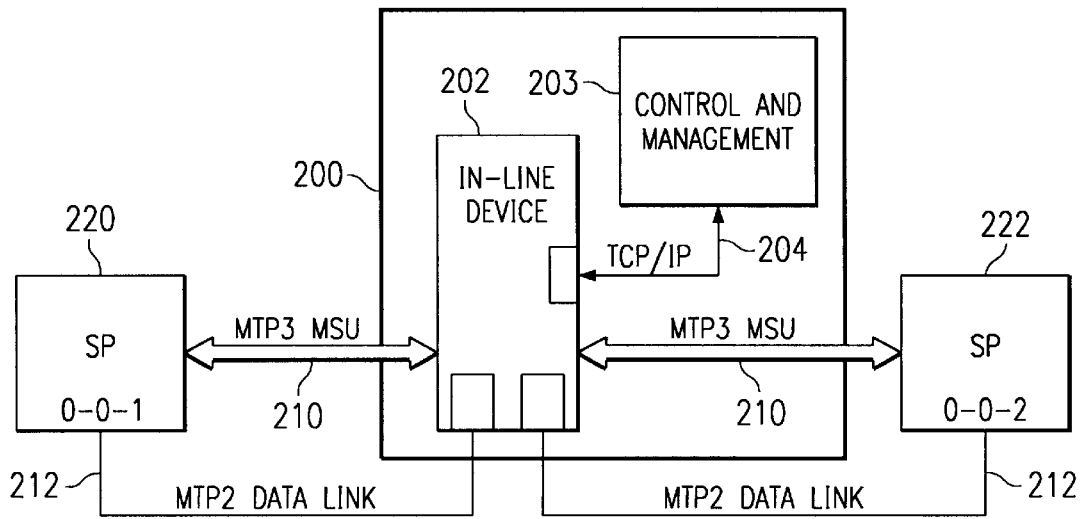
FIG. 2 is a functional block diagram of a portion of the system of FIG. 1.

FIG. 2 illustrates a single network segment of the global SS7 network 10 (FIG. 1). In FIG. 2, the reference numeral 200 refers to an SS7 security system of the present invention. It should be recognized that the system 200 is embodied in the firewall 14 of FIG. 1. The system 200 consists of an active, in-line sensor device 202 disposed between signaling points ("SPs") 220, 222, which may be, for example, an STP and an SSP or an SCP, and the global SS7 network. As shown in FIG. 2, the originating point code ("OPC") of the SP 220 is 0-0-1 and the OPC of the SP 222 is 0-0-2. The SS7 network includes redundant DS-1 or DS-0A links 212, which are high speed serial links. As described below, the in-line device 202 maintains access to both redundant SS7 linksets and maintains signaling state for the combined linkset. Finally, the system 200 includes a management device 203 that maintains configuration, health and status, and visibility into the in-line devices 202. Although not shown, the management device 203 is capable of controlling multiple in-line devices, such as the in-line device 202 within the network.

Several configurations are possible, whereby connectivity on the SS7 network may be a combination of physical layer access types such as: DS-1, DS-0A, DS-0, or V.35. For example, a complete SS7 implementation may be two DS-1s consisting of four DS-0As per DS-1 creating a combined linkset of 8 links.

The in-line device 202 is a fully active datalink layer (layer 2 of the seven layer OSI network model) device while providing layer three and above visibility and control. Network layer control messages, such as re-alignment messages, are transferred autonomously from node to node, e.g., from the SP 220 to the SP 222, within the network SS7. The in-line device 202 manages these messages and coordinates control between the end nodes. This allows end nodes to operate as master of Message Transfer Part ("MTP") 2, while communicating directly to the in-line device. MTP3 message signaling units ("MSU") 210 are transferred end-to-end making the in-line device 202 appear invisible to each SP 220, 222, at the network layer and above.

While not shown, it is understood that more than one network addressable in-line device 202 may be utilized within a service provider's network, at one or more locations, whereby security is provided by the device(s) for traffic into and out of a signaling point.

A control and management device 203 is connected via TCP/IP 204 to the in-line device 202 for storage and display of logs, alerting, programming control policy rules, providing simple visibility, configuration, and other operational features of the in-line device 202. Logs are piped using TCP/IP from the in-line device 202 to the control and management device 203 and may range from simple events to full SS7 call or transaction messages.

Figure 3:
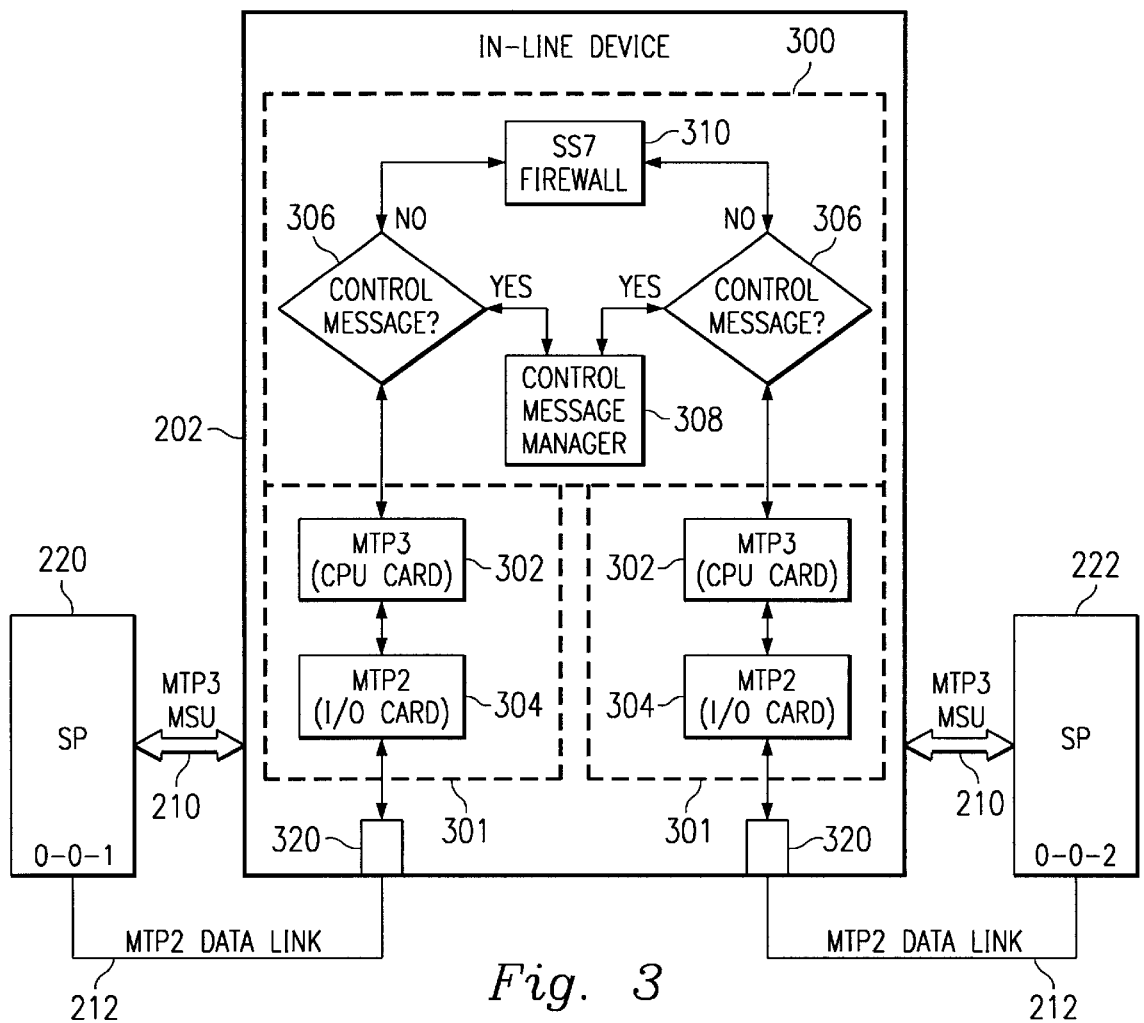
FIG. 3 is a more detailed functional block diagram of the system of FIG. 2.

Referring to FIG. 3, a functional schematic illustrates certain operational aspects of the system. In one embodiment, the in-line device 202 is configured with fully redundant SS7 I/O cards 304 for processing MTP 2 and fully redundant CPU cards 302 for processing MTP 3, ISUP, SCCP, and TCAP, all enclosed within a single chassis. The in-line device 202 combines call state monitoring, line control, and transaction state control for implementing access and service control functions. The inventive functions performed by the in-line device 202, as further described below, may be implemented with commercially available components as will be understood by those skilled in the art. While also not shown, it is understood that the in-line device 202 is controlled by computer programming instructions stored in memory within the in-line device and potentially other components of the system connected to the in-line device.

The in-line device 202 is a full MTP2 signaling link terminal. It also manages MTP3 management messages between end nodes (SPs 220, 222). It manages the coordination of MTP3 traffic management, link management, and route management messages to synchronize MTP2 events between the two links.

Functionally, the in-line device 202 consists of SS7 I/O logic 301, which contains MTP1, MTP2, and MTP3 SS7 stacks, located on the I/O card 304. The function of the stacks is to process MSUs for MTP3.

In addition, the device 202 contains MTP3 control logic located on the CPU card 302 and firewall software 300. These functions work independently of each other and provide the higher level visibility by processing signaling units into MSUs and MSUs into protocol data units ("PDUs") (layer 4 and above of the seven layer OSI network model).

As exemplified in FIG. 3, an SS7 MTP2 message signaling unit ("MSU") addressed for a signaling point, e.g., the SP 222, will first travel from a signaling point, e.g., the SP 220, through the in-line device 202 through an MTP1 port 320. The MSU travels up the SS7 protocol stack through the MTP2 I/O card 304 and the loosely coupled MTP3 stack 302. The MTP3 stack may reside on the CPU card 302, as shown in FIG. 3, or on the I/O card 304. Finally, the MSU is delivered to a control message access point 306. At this point, control messages, including traffic, link, and route management messages are diverted to the control message manager 308, or if the message is not a control/management message, then it continues to the firewall software 310. After being processed by either the SS7 firewall 310 or the control 20 message manager 308, the message continues on to the SP 222. MTP3 MSUs 210 are synchronized with both end nodes before the MTP2 protocol stack performs the requested function.

As will be described in greater detail below, the firewall software 310 enforces all control policy rules. All ISUP and SCCP traffic is processed through the SS7 firewall to enforce control policy. Higher-level SS7 protocol stacks reside in the SS7 firewall along with current control policy data. Management messages such as re-alignment messages bypass the firewall and are controlled by the in-line device's control message manager application. While not shown, it is understood that the device is able to communicate within an enterprise network with various hosts for providing management, configuration, and reporting functions.

Figure 4:
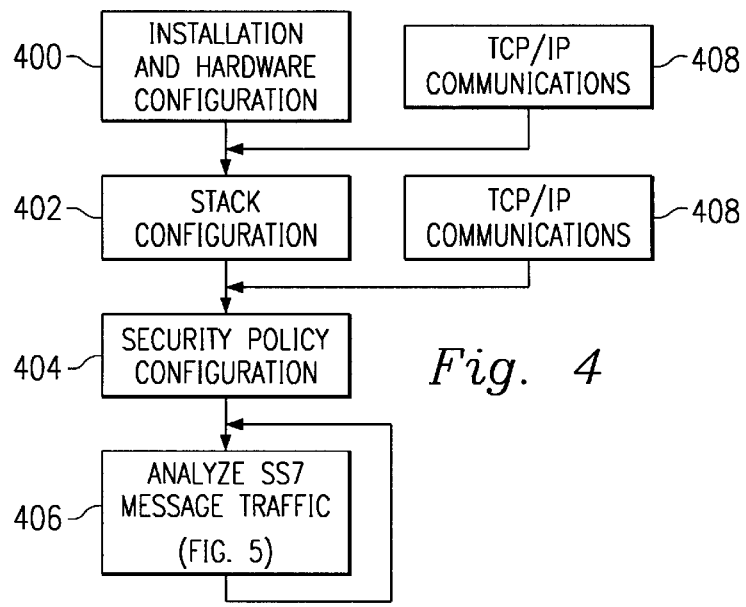
FIG. 4 is a flowchart of a method of installing, configuring, and executing the system of FIG. 1.

FIG. 4 is a flowchart illustrating installation, configuration, and operational processes of the system 200. Once installed and configured, it is understood that the system 200 is capable of operating in a continuous loop, retrieving, processing, and transmitting SS7 traffic while simultaneously performing appropriate actions in accordance with the defined control policy. There are, however, a few processes that are first performed as part of the installation and configuration of the system 200.

In step 400, the system 200 is installed and the hardware is configured. During installation and configuration, DS-1 lines, containing one or more channels of SS7 data, are connected to the in-line device 202. SS7 channel allocation and bypass channels are configured, as are logging location and stack parameters. In addition, IP address, subnet mask, and gateway values are configured. Finally, other management values are configured to include, but not limited to latency delay alerts, memory and CPU utilization alerts, and system monitor values.

In step 402, the SS7 stacks on the cards 302, 304 of the device 202 are configured. Configuration of the stacks includes setting point codes, circuit identification codes, changeover parameters, rerouting parameters, and other needed parameters for the end signaling points. These configurations are applied to the cards 302, 304 via a separate user interface using TCP/IP communications 408 and the control and management device 203.

In step 404 the SS7 control policy rules are configured, as described below with reference to FIG. 8. In one embodiment, a Rules Wizard GUI is used, guiding a user through a selection of rule types, parameter values, boolean logic selection, and exception configuration. In addition, the Rules Wizard allows users to sort, delete, and edit existing rules. This process includes definition of each control policy rule, including trigger function, action performed, and logging mechanism.

In step 406, SS7 message traffic is analyzed and control policy rules enforced thereon as the traffic passes through the device 202. The device 202 will apply defined control policy rules for all SS7 messages and either deny or pass the traffic based on a the user-defined control policy, as described below with reference to FIG. 5.

Figure 5:
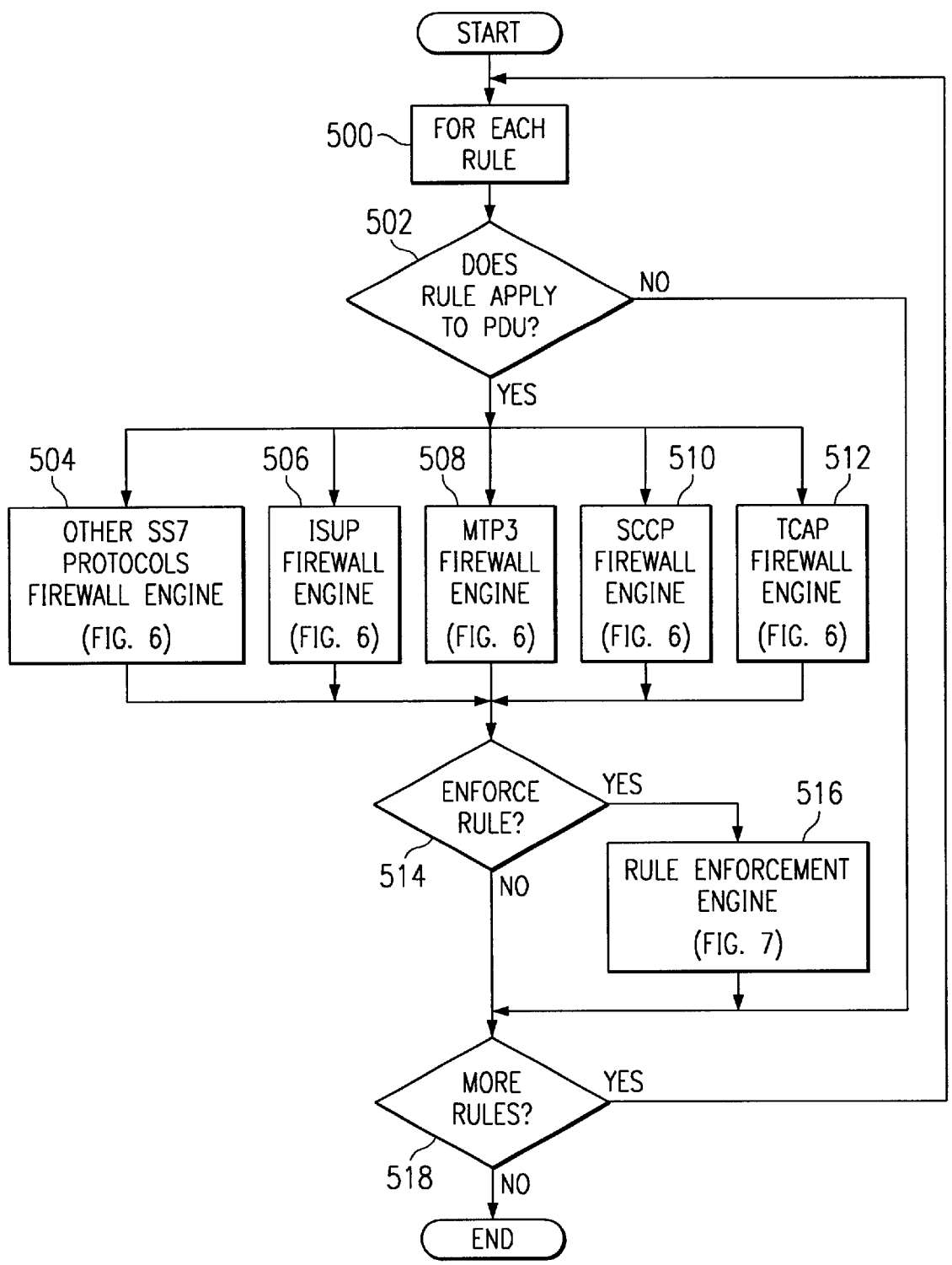
FIG. 5 is a flowchart of a method of applying control policy rules to SS7 messages in accordance with the present invention.

FIG. 5 is a flowchart illustrating the process of analyzing SS7 messages to determine whether or not to enforce a control policy rule with respect to the message. In general, the process consists of analyzing an SS7 message, determining whether a rule applies, applying the rule to the message, and acting on the message as the rule determines if the rule evaluates positively. Fundamentally, this process performs the pass/deny (with or without modifications) SS7 message traffic function. The function is an iterative process cycling through all security rules for each SS7 message.

In step 500, the next security rule in the queue is retrieved or, if the SS7 message is a new one, the first security rule is retrieved. In step 502, a protocol data unit ("PDU"), which is a data packet processed through OSI model layer 3 (the network layer), is dissected and a determination is made as to which upper layer protocol (OSI layer 4 or above) it is associated with. In addition, a determination is also made in step 502 what protocol (e.g., ISUP, TCAP, etc.) the current security rule is associated with. The two results are compared to determine whether the current rule applies to the current PDU. If so, control is transferred to the appropriate one of several protocol firewall engines 504, 506, 508, 510, and 512. Operation of each of the protocol firewall engines is described in greater detail below with reference to FIG. 6.

This process is best illustrated by example. Consider a single rule control policy in which the rule applies to the ISUP protocol. Assuming the current message is a TCAP message, the rule would not apply (step 502) and the message would not be routed to the TCAP firewall engine 512. In contrast, if the current message is an ISUP message, the rule would apply (step 502) and the message would be routed to the ISUP firewall engine 506.

The function of each of the firewall engines 504–512 is to apply a security rule to an associated PDU. These engines 504–512 provide the ability to filter on specific parameters within SS7 messages via static rules and to maintain signaling state and correlate PDUs with ongoing message processing via state rules. In addition, these engines 504–512 return either a "true" or a "false." If a rule evaluates true with the PDU, then the defined action must be performed; otherwise, the next rule is applied (if there are more rules) or execution terminates (if there are no more rules). The operation of the firewall engines 504–512 is further described in connection with FIG. 6.

The previously described steps associate PDUs through multiple layers within the OSI model. For example, an OPC, which is a layer 3 parameter, can be associated with an ISUP initial address message ("IAM"), which is a layer 4–7 protocol message. In addition the above-described steps correlate messages across time and maintain state between messages. Again, ISUP will be used to illustrate this concept. Five messages make up the signaling for a call:

1. Initial Address Message ("IAM")
2. Address Complete Message ("ACM")
3. Answer Message ("ANM")
4. Release Message ("REL")
5. Release Complete Message ("RLC")

The ISUP firewall engine 506 maintains state for these five message and provides the ability to deny or pass each message based on the previous message(s) for the current call. The engines 504–512 are multi-level, state-associated protocol rule processing engines. They provide both multiple layer visibility and visibility across time. For example, an REL can be correlated with an IAM, which occurs earlier in time. IAM occurs when a phone number is dialed, while an REL occurs when a phone is hung-up. In addition, an REL (OSI model layer 4–7) can be correlated with a routing label (OSI model layer 3), which is data provided at a different layer in the OSI model.

Referring again to FIG. 5, in step 514, a determination is made based on a Boolean true or false received from the respective engine 504–512 whether to perform the action defined by the current rule; i.e, whether to enforce the rule. In particular, if a true is received from the engine 504–512, the action must be performed and execution proceeds to step 516, in which the rule is enforced, as described in greater detail with reference to FIG. 7. Otherwise, execution proceeds to step 518. Similarly, if in step 502 it is determined that the current rule does not apply to the current PDU, execution proceeds to step 518. In step 518, a determination is made whether there are any more rules in the queue. If so, execution returns to step 500; otherwise, execution terminates.

Figure 6:
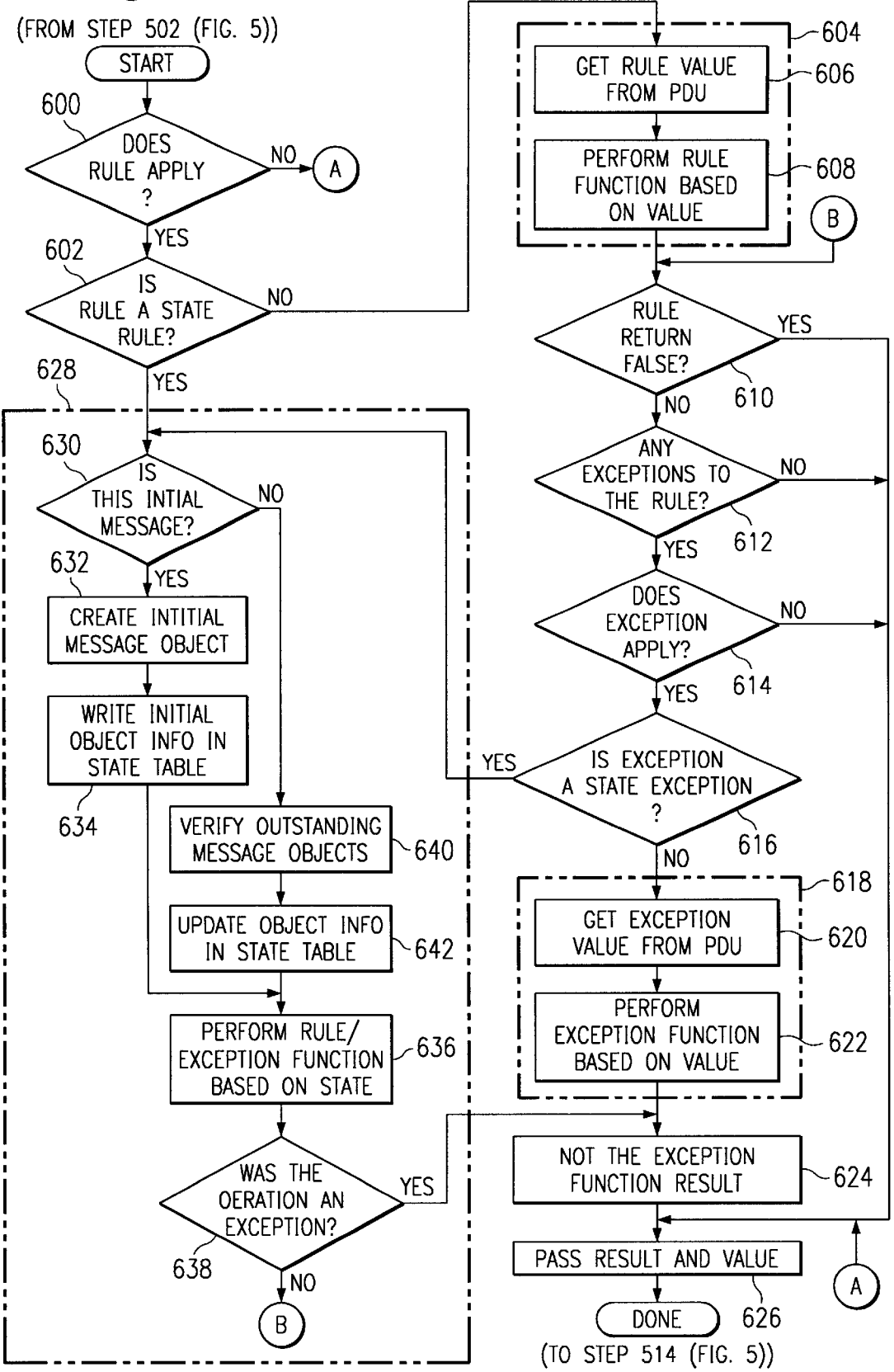
FIG. 6 is a flowchart of a method of implementing a firewall engine in accordance with the present invention.

FIG. 6 is a flowchart illustrating one possible implementation of each of the firewall engines 504–512 (FIG. 5), it being understood that numerous variations are possible. The process illustrated in FIG. 6 is implemented by each of the engines 504–512. In step 600, once the PDU has been delivered to the appropriate firewall engine 504–512, a determination is made whether the current rule applies. This is accomplished by comparing the information in the PDU with the criteria in the rule. If the rule applies, execution proceeds to step 602, in which a determination is made whether the rule is a state rule. Otherwise, execution proceeds to step 626, in which a value of false is passed by the engine 504–512, since no action is required. For example, if the current PDU under inspection is an IAM and the rule applied to REL messages, execution would proceed to step 626 and a value of false would be passed by the engine 504–512 to step 514 (FIG. 5).

In step 602, a determination is made as to whether the current rule is a state rule. If so, execution proceeds to a state rule/exception inspection engine 628; otherwise, execution proceeds to a static rule inspection engine 604. In step 606, the appropriate values, e.g., caller number, calling number, or OPC, are retrieved from the PDU as determined by the rule. In step 608, the function defined by the rule based on the value received from the PDU is performed. For example, if the rule stated that 800 number translations are to be blocked, the subsystem number ("SSN") of the packet would be checked to determine whether it designated 800# translations. If so, the rule function would return a true; otherwise the rule function would return a false. The result of the evaluation performed by the static rule inspection engine 604 is passed to step 610, in which a determination is made as to whether the rule function returned a false. If so, execution proceeds to step 626, in which a "no" is returned to step 514; otherwise, execution proceeds to step 612, in which a determination is made whether there are exceptions to the rule. If not, execution proceeds to step 626, in which a "no" is returned to step 514; otherwise, execution proceeds to step 616, in which a determination is made whether the exception is a state exception. If so, execution proceeds to a state rule/exception inspection engine 628; otherwise, execution proceeds to a static exception inspection engine 618.

In step 620, the appropriate values are retrieved from the PDU. In step 622, the function defined in the exception is executed based on the value(s) retrieved from the PDU in step 620. For example, if the exception stated that 800 number translations except for PDUs with OPC of 7-8-9 were to be blocked, the OPC of the packet would be checked to see if it was 7-8-9. If so, the exception function would return a true; otherwise, it would return a false. Execution proceeds from step 622 to step 624, in which the result from step 622 is inverted; that is, a "NOT" function is applied. Execution then proceeds to step 626, in which the resultant value is passed to step 514 (FIG. 5).

If in step 602 it is determined that the rule is a state rule or if in step 616 it is determined that the exception is a state exception, execution proceeds to a state rule/exception inspection engine 628. In step 630, a determination is made whether the current message is an initial message for a sequence of messages to follow. If so, execution proceeds to step 632, in which an initial message object is created, step 634, in which the initial object information is written to a state table, and then to step 636, in which the rule or exception function is executed based on the criteria in the rule or exception and the state of the message.

If in step 630 it is determined that the message is not the initial message for a sequence of messages to follow, execution proceeds to step 640, in which outstanding message objects are verified, to step 642, in which the object information in the state table is updated, and then to step 636, as described above. In step 638, a determination is made whether the operation was for an exception. If so, execution proceeds to step 624, as described above; otherwise, execution returns to step 610.

Figures 7, 8:
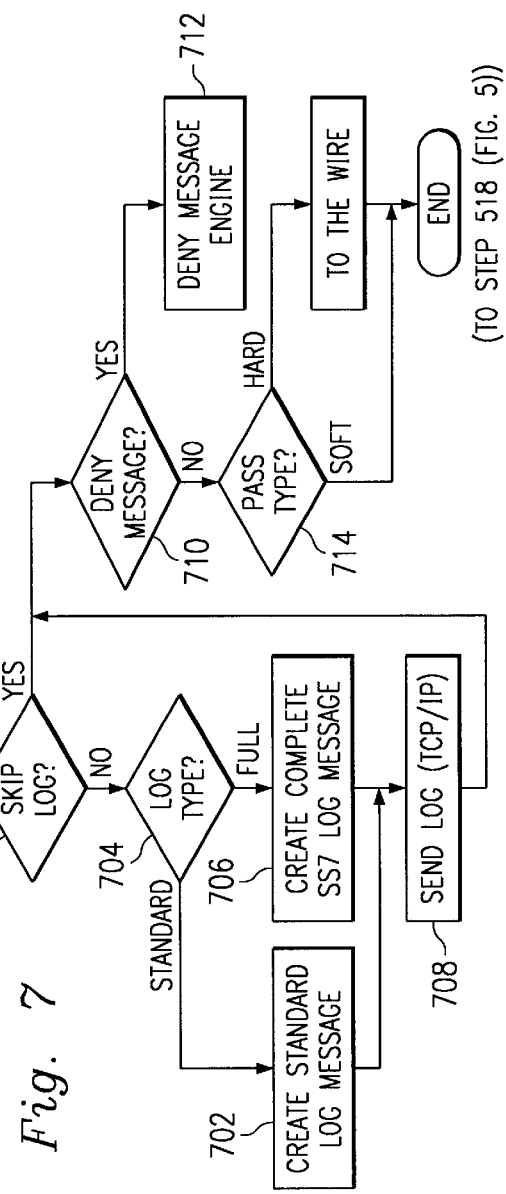
FIG. 7 is a flowchart of a method of applying a control policy rule to an SS7 message in accordance with the present invention.
FIG. 8 is table illustrating some exemplary control policy rules that might be part of a control policy of the present invention.

FIG. 7 illustrates a process of enforcing a security rule with respect to a particular PDU. Each rule includes an action that must be performed and a possible logging event to occur if the rule applies. The rule enforcement function processes the rule to perform the action and then branches appropriately to perform the required logging events. Actions consist of denying the PDU, passing the PDU to the next rule, or passing the PDU directly back to the wire (toward its destination). Logging may or may not occur, depending on the rule. A rule may generate a standard log or a full log, which contains the entire PDU. Logs are not maintained on the in-line device 202, but are transferred via TCP/IP to the control and management device 203.

Referring to FIG. 7, in step 700, a determination is made whether the rule defines a logging event. If a logging event is defined, execution proceeds to step 704, in which a determination is made as to the type of logging event to occur. If in step 700 it is determined that no logging event is defined by the rule, execution process to step 710, in which a determination is made whether to deny the message. This process maximizes performance while maintaining the ability to log complete messages.

In step 704, a determination is made as to which type of logging to perform. In general, each security rule can generate a full or standard log message. Full log messages include the event, time, and binary PDU. Standard log messages include only the event and time. By providing a full log message, the in-line device 202 provides the ability to export the SS7 PDUs on TCP/IP to the control and management device 203. For example, a rule may pass all ISUP messages and generate a full log message. The in-line device 202 will pass the ISUP message along, but will also export a copy of the message on TCP/IP to the control and management device 203 for full processing by another computer system (not shown). If in step 704, it is determined that a standard log message is to be generated, execution proceeds to step 702, in which a standard log message is created. Otherwise, execution proceeds to step 706, in which a complete SS7 ("full") log message is created. In this manner, steps 702 and 706 create the appropriate log message for export via TCP/IP. This function packages time and event codes into a binary log message. For full log messages (step 706), a copy of the PDU is also included within the package.

From step 702 or 706, execution proceeds to step 708, in which the message is transported via TCP/IP to the control and management device 203. The IP address the control and management device 203 is configured during installation and hardware configuration (FIG. 4). In step 710, a determination is made as to whether the action defined by the rule is to deny the message. If so, execution proceeds to step 712, in which a "Deny Message" engine function is executed. The Deny Message engine will either negatively respond to a message or drop the message entirely. For some ISUP and TCAP messages, a negative response is required, while others only require the message not to be forwarded on. This process, along with the configuration of the in-line device 202, provides the logic and data to deny or block PDUs.

If in step 710 it is determined that the action defined by the rule is not to deny the message, execution proceeds to step 714, in which a determination is made as to the pass type defined by the rule. In particular, in one embodiment, the rule will either "pass-soft" or "pass-hard" the PDU. Pass-soft is defined as passing the PDU to the next rule, if one exists. Pass-hard is defined as passing the PDU directly to the wire, meaning that all other rules are by-passed and the massage is placed in MPT3 (I/O card 302) for immediate transmission on the high speed links 212 comprising the SS7 network. The difference between the passing types may be illustrated as follows. A rule may be defined to pass-soft all IAMs, while logging the full SS7 message. This allows all IAMs to traverse the wire, while the in-line device 202 exports a copy to the TCP/IP network 204. The second example is to pass-hard all 911 calls. Rather than take time to continue processing these calls through all security rules, pass them directly back on the SS7 network via the high speed links 212.

FIG. 8 illustrates an example security rule 800. The rule 800 states that incoming REL messages destined for idle circuits are to be blocked and fully logged with an alert generated unless the OPC of the REL message equals 21-22-23. Note that this particular rule/exception combination contains a state rule and a static exception. It also requires information from multiple layers of the protocol stack. This rule might be applied to prevent out-of-sequence REL message from disturbing idle circuits. The exception might be used to allow out-of-sequence REL messages that are from a trusted source whose OPC is 21-22-23.

Referring to FIGS. 5 and 6, for an REL message that was destined for an idle circuit and its OPC equals 1-2-3, in step 502 (FIG. 5), the REL would be routed to the ISUP firewall engine 506 (FIG. 5). In this case, the rule would be sent to state rule/exception inspection engine 628 to determine the state of the REL message. The state rule/exception inspection engine 628 would determine that this REL message is in fact out-of-sequence because it is destined for an idle circuit. This determination results in a value of true at step 636. Since this was not an exception, execution proceeds to step 610 and then to step 612, since a value of true was computed. In step 612, a determination is made that there is an exception and in step 614, it is determined that the exception applies. In step 616, it is determined that the exception is static and execution proceeds to the static exception inspection engine 618. The static exception inspection engine 618 then checks the value of the OPC in the REL message. The OPC does not match the criteria in the rule; therefore, the engine 618 computes a value of false and execution proceeds to step 624. In step 624, the false is inverted and a true is passed to step 626. The value of true is then returned to step 514 (FIG. 5), and execution proceeds to the rule enforcement engine 516, which enforcer the actions in the rule. Step 516 generates the full log message and block s the REL message. At this point, the rule has been enforced and execution proceeds to step 518 to check for more rules.

It is understood that the present invention can take many forms and embodiments. The embodiments shown herein are intended to illustrate rather than to limit the invention, it being appreciated that variations may be made without departing from the spirit of the scope of the invention. For example, any number of different rule criteria for the control policy may be defined. Different attribute descriptions and rule descriptions are contemplated. The algorithms and process functions performed by the system may be organized into any number of different modules or computer programs for operation on one or more processors or workstations within the system. Different configurations of computers and processors for the system are contemplated. The device may be implemented on the STP, the SCP, the SSP, or any other SS7 signaling device. The programs used to implement the methods and processes of the system may be implemented in any appropriate programming language and run in cooperation with any hardware device. The system may be used for service providers, Internet Service Providers, enterprises, and many other entities utilizing SS7 signaling devices.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. An apparatus for controlling and securing Signaling System 7 ("SS7") message traffic between a first and a second Signaling Point (SP) in an SS7 network, the apparatus comprising:

a firewall connected between the first and second Signaling Points ("SPs") for controlling ingress and egress of the SS7 message traffic to and from the SPs and logging security events in accordance with a control policy; and a control and management device connected to the firewall via a Transmission Control Protocol/Internet Protocol ("TCP/IP") link, the control and management device for storing and displaying event logs, alerting a system administrator to security events, and storing programming control policy rules.

2. The apparatus of claim 1 wherein said firewall comprises an active in-line sensor device comprising:

a Signaling System 7 ("SS7") Input/Output ("I/O") card for processing Message Transfer Part ("MTP") 2;

a Central Processing Unit ("CPU") card in electronic communication for processing MTP3, Integrated Services Digital Network ("ISDN") User Part ("ISUP"), Signaling Connection Control Part ("SCCP"), and Transaction Capability Application Part ("TCAP") in electronic communication with the SS7 I/O card;

an MTP1 port in electronic communication with the CPU card; and firewall software running on the CPU card for enforcing all control policy rules.

3. The apparatus of claim 1 wherein the first Signaling Point ("SP") is a Signaling Transfer Point ("STP").

4. The apparatus of claim 3 wherein the Signaling Transfer Point ("STP") is connected to a global SS7 network.

5. The apparatus of claim 1 wherein the second Signaling Point ("SP") is an SP selected from the group consisting of a Service Switching Point ("SSP") and a Service Control Point ("SCP").

6. The apparatus of claim 1 wherein the control policy is defined by a user.

7. The apparatus of claim 1 wherein the firewall includes firewall software comprising:

instructions for determining whether a control policy rule applies to a Signaling System 7 ("SS7") message;

instructions for determining whether the control policy rule should be enforced with respect to the SS7 message responsive to a determination that the control policy rule applies to the SS7 message; and instructions for enforcing the control policy rule responsive to a determination that the control policy rule should be enforced with respect to the SS7 message.

8. The apparatus of claim 7 where the instructions for enforcing the control policy rule comprise:

instructions for performing an action defined by the control policy rule;

instructions for determining whether an event should be logged in connection with the control policy rule; and instructions for logging the event responsive to a determination that an event should be logged in connection with the control policy rule.

9. The apparatus of claim 8 wherein the instructions for logging the event further comprise:

instructions for determining whether a standard log message or a complete log message is specified; and instructions for creating the type of log message specified.

10. A method of controlling and securing Signaling System 7 ("SS7") message traffic in an SS7 network, the method comprising:

defining a control policy for a set of Signaling Points ("SPs"), the control policy comprising at least one rule;

for each SS7 message into or out of one of the SPs:

determining whether the at least one rule applies to the SS7 message;

responsive to a determination that the at least one rule applies to the SS7 message, determining whether the at least one rule should be enforced with respect to the SS7 message; and responsive to a determination that the at least one rule should be enforced with respect to the SS7 message, enforcing the at least one rule.

11. The method of claim 10 wherein the enforcing the at least one rule comprises:

performing an action defined by the at least one rule;

determining whether an event should be logged in connection with the at least one rule; and responsive to a determination that an event should be logged in connection with the at least one rule, logging the event.

12. The method of claim 11 wherein the logging the event further comprises:

determining whether a standard log message or a complete log message is specified; and creating the type of log message specified.

13. The method of claim 12 wherein the performing an action defined by the at least one rule comprises denying or passing the SS7 message.

14. The method of claim 13 wherein passing the Signaling System 7 ("SS7") message comprises hard-passing the SS7 message.

15. The method of claim 13 wherein passing the Signaling System 7 ("SS7") message comprises soft-passing the SS7 message.

16. The method of claim 13 wherein denying the Signaling System 7 ("SS7") message comprises negatively responding to the SS7 message.

17. The method of claim 13 wherein denying the Signaling System 7 ("SS7") message comprises dropping the SS7 message.

18. A system for controlling and securing Signaling System 7 ("SS7") message traffic in an SS7 network, the system comprising:

means for defining a control policy for a set of Signaling Points ("SPs"), the control policy comprising at least one rule;

means for determining whether the at least one rule applies to the SS7 message;

means responsive to a determination that the at least one rule applies to the SS7 message for determining whether the at least one rule should be enforced with respect to the SS7 message; and means responsive to a determination that the at least one rule should be enforced with respect to the SS7 message for enforcing the at least one rule.

19. The system of claim 18 wherein the means for enforcing comprises:

means for performing an action defined by the control policy rule;

means for determining whether an event should be logged in connection with the control policy rule; and means for logging the event responsive to a determination that an event should be logged in connection with the control policy rule.

20. The system of claim 19 wherein the means for logging the event further comprises:

means for determining whether a standard log message or a complete log message is specified; and means for creating the type of log message specified.

21. The system of claim 20 wherein the means for performing an action defined by the at least one control policy rule comprises means for denying or passing the Signaling System 7 ("SS7") message.

22. The system of claim 21 wherein the means for passing the Signaling System 7 ("SS7") message comprises means for hard-passing the SS7 message.

23. The system of claim 21 wherein the means for passing the Signaling System 7 ("SS7") message comprises means for soft-passing the SS7 message.

24. The system of Claim 21 wherein the means for denying the Signaling System 7 ("SS7") message comprises means for negatively responding to the SS7 message.

25. The system of claim 21 wherein the means for denying the Signaling System 7 ("SS7") message comprises means for dropping the message.

* * * * *